Patented Oct. 16, 1945

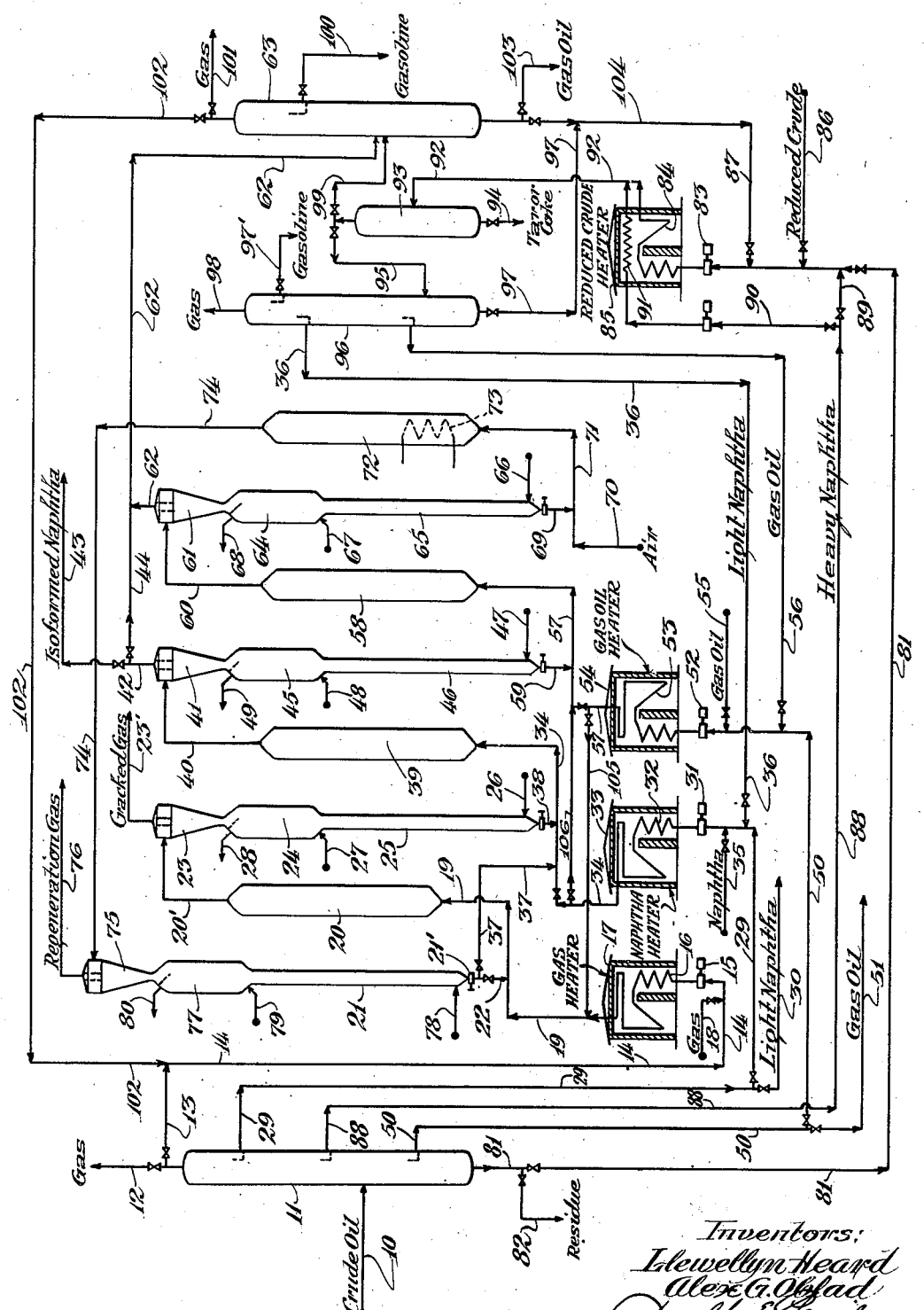

2,387,088

UNITED STATES PATENT OFFICE 2,387,088

CATALYTIC HYDROCARBON CONVERSION SYSTEM

Alex G. Oblad, Chicago, Ill., and Llewellyn Heard, Hammond, Ind., assignors to Standard Oil Company, Chicago, Ill., a corporation of Indiana Application January 31, 1941, Serial No. 376,820

6 Claims. (Cl. 196—52)

This invention relates to a catalytic system for the conversion of hydrocarbons into high quality motor fuel and it pertains more particularly to a system employing a solid catalyst of a type which is initially highly active but which gradually becomes less active due to the deposition thereon of a carbonaceous coating.

Different fractions of crude oil require different treatments for effecting a conversion thereof into high quality motor fuel. The gas fraction may be employed in an alkylation process, it may be cracked or dehydrogenated and polymerized etc. The light naphtha fraction may only require desulfurization but it may be improved by isomerization, aromatization or reforming. Heavy naphtha may be either thermally or catalytically reformed or aromatized. Gas oil is preferably subjected to catalytic cracking. Heavier fractions, such as reduced crude, may be subjected to a viscosity breaking conversion for obtaining gas oil charging stocks or it may be thermally or catalytically cracked. Naphtha from thermal cracking processes may be markedly improved in octane number by catalytic reforming or isoforming processes. An object of our invention is to provide a unitary system for effecting a plurality of the above processes by means of a single catalyst and to effect at least two of such reactions by said catalyst prior to catalyst regeneration.

Silica-alumina type catalysts may be used for the catalytic cracking of both light and heavy petroleum fractions as well as for the desulfurizing and treating of various naphthas. When fresh or regenerated catalyst is used for the cracking of gas oil it exhibits such a high initial activity that there is an over-treating, i. e., a decomposition of the gasoline originally produced and a consequent degradation of the charging stock resulting in the deposition of unduly large amounts of coke on the catalyst and the formation of unduly large amounts of gas. Similarly, when thermally cracked naphtha is isoformed the octane number improvement in the initial stages of a treatment with fresh or regenerated catalyst is considerably less than the octane number improvement produced by a catalyst which has been on-stream for a short period of time. An object of our invention is to avoid the initial over-treating of naphtha or other charging stocks. A further object is to employ a catalyst both for the treating of naphtha and for the treating of gas oil and heavier hydrocarbons in two separate steps before the catalyst is regenerated for reuse.

Our invention is applicable to fixed and moving bed systems but it is particularly applicable in a system wherein the catalyst effects the desired conversion while it is suspended in reaction vapors and wherein the catalyst is regenerated while suspended in regeneration gases. An important feature of this system is the separation of suspended catalyst from one reaction stream and the suspension of the catalyst in a different reaction stream prior to the suspension of the catalyst in the regeneration stream. Other objects of the invention will become apparent from the following detailed description.

In practicing our invention we first deposit sufficient carbonaceous material on the catalyst to inhibit initial superactivity and we then employ the conditioned catalyst for effecting the desired conversion. For example, we may first contact the catalyst with hydrocarbon gases at a temperature of about 950 to 1250° F. whereby the gases are partially cracked and converted into olefins which are particularly suitable for polymerization, alkylation, gas reversion, or other industrial uses. The time of contact with such gases is sufficiently short to prevent appreciable carbonaceous deposits but is long enough to deposit a small amount, preferably about .05 to 1.0% by weight. This carbonaceous deposit apparently coats or modifies the superactive catalyst spots and prevents overtreating when the catalyst is subsequently employed for effecting the desulfurizing or isoforming of naphtha or for effecting the cracking of gas oil or heavier hydrocarbons.

Since relatively small amounts of carbonaceous material are deposited on the catalyst in naphtha treating processes we may effect the initial catalyst coating by a naphtha treating process instead of or in addition to the gas treating processes. A freshly regenerated catalyst or a catalyst which already contains a slight carbonaceous film may be used for reforming naphtha, isoforming thermally cracked naphtha or desulfurizing a light or heavy naphtha. In the naphtha treating process about 0.05 to 1.0, preferably about 0.1 to 0.5% of carbonaceous material is deposited on the catalyst by a proper selection of temperature, time of contact, space velocity, etc., so that the quality of the naphtha is materially improved at the same time that the catalyst is being conditioned for the subsequent cracking step.

Catalyst which has received a light carbonaceous deposit in the gas or naphtha treating steps is then contacted with gas oil or heavier hydrocarbon vapors at a temperature of about 800 to 1000° F. and with a time of contact, space velocity, etc., to obtain the desired conversion of these heavy hydrocarbons into high quality motor fuel.

By preconditioning the catalyst the initial overtreating will be avoided, and there will be a marked improvement in product distribution, i. e., a minimum degradation to gas and coke. When the catalyst has become relatively spent in the cracking step, it may be regenerated and returned to one or more of the preconditioning steps.

We prefer to employ the catalyst for treating naphtha before it is employed for cracking gas oil or heavier hydrocarbons because less carbon is deposited in the initial steps of naphtha treating processes than in initial steps of cracking. Also the naphtha treating processes are usually at higher temperatures than cracking so that the catalyst is employed in a gradually decreasing temperature sequence from the regeneration step to the final cracking step. Advantages may be obtainable, however, by treating naphtha with a catalyst which has become partially spent in the catalytic cracking of gas oil; isoforming may be effectively accomplished by a catalyst which contains appreciable carbonaceous deposits and by properly selecting the space velocities and other reaction conditions a catalyst which is no longer desirable for effecting cracking may be advantageously applied for the treating of naphtha.

An outstanding feature of our invention is the conditioning of catalyst by applying a light carbonaceous coating on superactive catalyst surfaces. A considerable amount of carbonaceous material may remain in the catalyst particles after regeneration due to incomplete combustion in the regeneration step. This residual carbon does not serve the function of preconditioning the catalyst and is, in fact, detrimental. In practicing our invention, we effect regeneration to as complete an extent as is commercially feasible and we then apply a light carbonaceous deposit on the active surfaces of the catalyst before the catalyst is employed in a subsequent treating or cracking step.

The invention will be more fully understood from the following detailed description read in conjunction with the accompanying drawing which forms a part of this specification and is a schematic flow diagram of a preferred embodiment of our unitary conversion system.

The charging stock to our system may be crude oil or fractions thereof, or it may be a synthetic hydrocarbon prepared by a carbon monoxide-hydrogen synthesis or by the hydrogenation of coal. This crude oil or other charging stock may be heated in a suitable pipe still (not shown) and introduced through line 10 into crude oil fractionating column 11. The gas fraction may be withdrawn from the system through line 12 or all or just the $C_3$-$C_4$ fraction passed by lines 13 and 14 and pump 15 to coils 16 of gas heater pipe still 17. If gas is vented through line 12 a gas from extraneous sources such as a $C_3$-$C_4$ fraction may be introduced through line 18. In the pipe still the gas is heated to a temperature of about 950 to 1250° F., preferably about 1100° F., and is then passed through transfer line 19 to reactor 20 for effecting gas cracking.

Fresh or regenerated powdered catalyst is withdrawn from the base of standpipe 21 by a suitable valve or star feeder 21' and either introduced by line 22 into transfer line 19 or introduced directly into reactor 20. The catalyst is preferably of the silica-alumina type. Acid treated bentonite of the type commonly marketed as Super Filtrol may be advantageously used for this purpose, preferably in powdered form with a particle size ranging from about 200 to 400 mesh. Synthetic catalysts may be prepared by depositing alumina or other active metal oxide either on or in silica gel. For instance, the silica gel may be formed in an aluminum salt solution and the resulting gel freed from acids and alkali metals by boiling with dilute ammonium hydroxide and washing. The gel particles may then be crushed, dried and heated to about 850 to 1000° F. Another efficient catalyst may be made by ball milling magnesia with silica gel in the presence of sufficient moisture to form a doughy mass which may be dried, crushed and heated to a temperature of about 850 to 1000° F. An alumina-silica-zirconia catalyst has been found to give excellent results in cracking as well as other conversion processes. The silica-alumina and silica-magnesia catalysts generally will be referred to herein as catalysts of the silica-alumina type and they are characterized by their tendency to become coated with carbonaceous materials during the course of conversion. Such catalysts are well known in the art and require no further detailed description.

The amount of catalyst charged to the gas cracking step may be the amount later required for the naphtha treating or gas oil cracking steps. The residence time of this catalyst in reactor 20 should be sufficiently short to prevent the carbonaceous deposit from exceeding about 1% and it preferably should not exceed about 0.5% but should be at least 0.05%. This reactor may, therefore, be of relatively small diameter as compared with other reactors in the system and a relatively short contact time and catalyst holding time may be provided. Reaction conditions at this stage may be varied to accomplish the desired conversion of the gaseous hydrocarbons but it is preferably carried out under such conditions that only about .05 to 1%, for example about .2%, of carbonaceous material is deposited on the catalyst (based on weight of catalyst). The vertical velocity of gas flow through reactor 20 should be upwards of about 1 or 2 feet per second and the gaseous stream will thus carry the catalyst through line 20' to one or more cyclone separators or other separation devices 23 from which the cracked gases are vented through line 23' to a suitable alkylation, polymerization, gas reversion or olefin recovery step.

The coated catalyst falls from separator 23 into hopper 24 and thence to standpipe 25. The standpipe may be aerated by an inert gas such as a hydrocarbon gas or steam introduced through line 26. Additional aerating gas may be introduced at the base of the hopper through line 27. The aerating gases may be vented through line 28 to separation system 23 or line 23'.

Naphtha is withdrawn from tower 11 through line 29 and it may be withdrawn from the system through line 30 or forced by pump 31 through coils 32 of naphtha heater pipe still 33 to transfer line 34 and thence subjected to desulfurization. Naphtha from other sources may be introduced into coils 32 from lines 35 or 36. Thermally cracked naphtha is the preferred charge to the naphtha treating step and the treating of this charge is called isoforming. This naphtha may be heated in coils 32 to temperature of about 800 to 1100° F., preferably about 900 to 1000° F., and the transfer line pressure is preferably about atmospheric to about 50 pounds per square inch, preferably about 10 or 15 pounds per square inch. Catalyst from standpipe 21 may be introduced into this transfer line through line 37 or preconditioned catalyst may be introduced thereto through line 38. In other words, we may use the gas cracker 20 for preconditioning catalyst subsequently used for naphtha treating or we may use the naphtha treating step itself for preconditioning catalyst for catalytic cracking. In the latter case reactor 20, standpipe 25, gas heater 17, etc., may be entirely dispensed with.

The hot naphtha vapors together with suspended catalyst are introduced at the base of reactor 39 although it should be understood that the catalyst may be introduced directly into this reactor instead of with incoming naphtha vapors. Reactor 39 is preferably operated with upward vertical vapor velocities of about .5 to 5 feet or more per second. The amount of catalyst in the reactor for effecting isoforming of thermally cracked naphtha may be expressed by the formula $$T = at^{.534}$$

where T is tons of catalyst in the reactor per hundred barrels of naphtha charged to the reactor per hour, $t$ is catalyst residence time or "holding time" in the reactor expressed in minutes and $a$ is a constant which may range from about 0.005 to 0.05, preferably 0.02. The time of oil contact in the reactor may range from about 2 to 40 or more seconds. The size and cross-sectional area of the reactor should be of sufficient magnitude so that the vertical vapor velocity therein will result in a catalyst density which will give the approximate amount of catalyst in the reactor indicated by the above formula. Catalyst is withdrawn from the reactor at substantially the same rate as it is introduced thereto and the treated naphtha vapors together with this withdrawn catalyst are introduced by line 40 into one or more cyclone separators or equivalent separation means 41 from which vapors are removed through line 42 and line 43 to a separate fractionator system or through line 44 to the fractionator for catalytic conversion products.

The catalyst falls from separator 41 to hopper 45 and thence to standpipe 46. Aerating gas is introduced through lines 47 and 48 and may be withdrawn through line 49.

The gas oil fraction from separator 11 is withdrawn through line 50 and either discharged from the system through line 51 or forced by pump 52 through coils 53 of gas oil pipe still 54. Any gas oil or heavier charging stock may be introduced from outside sources through line 55 and the light gas oil may be recycled from another part of the system through line 56. In coils 53 the gas oil is heated to a transfer line temperature of about 800 to 1050° F., preferably about 925 to 950° F. and at a transfer line pressure of about atmospheric to about 50 pounds per square inch, preferably about 10 to 15 pounds per square inch. Transfer line 57 introduces these hot gas oil vapors to the base of reactor 58. Catalyst from standpipe 46 is either introduced into the transfer line 57 through line 59 or is introduced directly into the base of reactor 58. The weight ratio of catalyst-to-oil introduced into one reactor may vary from about .1:1 to 10:1 but is preferably about 3:1.

The amount of catalyst which is maintained in catalyst reactor 58 is represented by the formula hereinabove stated:

$$T = at^{.534}$$

but in this case the constant $a$ ranges from .3 to 3.0 and is preferably about 1.2 although with weak catalysts and refractive stocks, etc., it may be necessary to go up as high as 6 or even 12. T is tons of catalyst per hundred barrels of gas oil feed per hour charged to the reactor and $t$ is catalyst residence time in minutes. Reactor 58 is designed with sufficient cross-sectional area to give a vertical vapor velocity of about .5 to 5, preferably about 1.5 to 2 feet per second which will result in a catalyst density of about 1 to 35, preferably about 10 to 20 pounds per cubic foot. The residence time of the gas oil vapors in the reactor may range from a few seconds to one or more minutes, preferably about 2 to 40 seconds.

Reaction products and spent catalyst are withdrawn from the top of reactor 58 through line 60 and introduced into one or more cyclone separators or other suitable separation means 61 from the top of which reaction products are withdrawn through line 62 to a fractionating system diagrammatically represented by column 63.

Spent catalyst drops from separator 61 to spent catalyst hopper and stripper 64, thence to standpipe 65. Aerating gas is introduced through line 66 and stripping gas through line 67, these gases being removed from the top of the hopper through line 68 and either returned to the separating means 61 or introduced into line 62.

Spent catalyst from the base of standpipe 65 is discharged through line 69, picked up by air introduced through line 70 and introduced through line 71 to the base of regenerator 72 although here again it should be understood that the air or oxygen-containing gas may be introduced directly at the base of the regenerator and the spent catalyst may be injected directly into the regenerator by any suitable means. The regenerator may be a large cylindrical vessel with a conical bottom, a vessel of the same type as reactors 39 and 58. For a dense phase regeneration the regenerator should have sufficient cross-sectional area to provide a vertical gas velocity therein of about .5 to 5, preferably about 1½ feet per second. The regenerator should be of sufficient size to permit the necessary combustion of carbonaceous material from the catalyst. Some of the heat of combustion may be removed by circulating a cooling fluid through coils 73 or by externally cooling regenerated catalyst and recycling said catalyst to the regenerator. The maximum permissible temperatures in the regenerator will depend upon particular catalysts employed and for silica-alumina catalyst this temperature is usually about 1050 to 1100° F. or lower.

Regeneration gases with suspended regenerated catalyst are withdrawn from the top of regenerator 72 through line 74 and introduced into one or more cyclone separators or other suitable separation means 75 from which the regeneration gases are vented through line 76 to suitable heat recovery means such as waste heat boiler, turbines or the like.

Hot regenerated catalyst preferably at a temperature of about 1000° F. falls from separator 75 into hopper 77 and thence to standpipe 21. A hot aerating gas is introduced through lines 78 and 79. Such gases are removed through line 80 either to the separation system 75 or to line 74.

The residue or liquid fraction from the base of fractionating tower 11 is withdrawn through line 81 and either removed from the system through line 82 or forced by pump 83 through coils 84 of reduced crude pipe still 85. Reduced crude or heavy charging stocks may be introduced from other extraneous sources through line 86 and a refractory gas oil may be introduced through line 87. The heavy naphtha fraction withdrawn from tower 11 through line 88 may be introduced through line 89 to coils 84 or may be passed through line 90 to separate coils 91 in the reduced crude pipe still or independent heater. When separate coils are used the material discharged from coils 84 may be of a temperature of about 850 to 1050° F., preferably about 905° F. and the vapors discharged from coils 91 may be of a temperature of about 900 to 1100° F., preferably about 1000° F. These streams are introduced by transfer lines 92 to coke drum or evaporator 93 from the base of which coke or tar may be withdrawn through the base of the drum or line 94. Overhead products from the coke drum or evaporator are withdrawn through line 95 to bubble tower 96 from the base of which a refractory gas oil is withdrawn through line 97 and returned by line 87 to coils 84. If desired a light gas oil fraction (e. g. about 600° F. to 650° F. end point) may be withdrawn through line 56 to coils 53 of gas oil heater 54. The gasoline fraction may be withdrawn through line 97' for treating, blending or storage or it may be withdrawn through line 36 to naphtha heating coils 32 and thence charged to reactor 39 for isoforming. Coke still naphtha is an excellent isoforming charging stock. The gas withdrawn through line 98 may be charged to an alkylation, polymerization, gas reversion or other external process.

If desired the overhead from the evaporator may be introduced through line 99 to fractionating column 63. Gasoline from this column may be withdrawn through line 100 for further treating, blending or storage. Gases may be withdrawn through line 101 for use in other processes or it may be passed through line 102 to line 14 and coils 16 of gas heater 17. The cycle gas oil from the base of column 63 may be withdrawn from the system through line 103 or recycled through line 104 and line 87 to coils 84 of the thermal pipe still 85 or passed through separate coils and fractionating systems to produce isoformable charging stocks.

In the preferred embodiment of the invention hereinabove described the hot regenerated catalyst was first conditioned by contact with a hydrocarbon gas, then used for the treating of naphtha and then for the cracking of gas oil. In such a process the gas contacting step might be at a temperature of about 1000 to 1050° F., the naphtha treating at a temperature of about 950° F. and the cracking at a temperature of about 900° F. The gas contacting step may, however, be omitted and the catalyst may simply be employed for treating naphtha and gas oil respectively. Certain advantages may be obtained by utilizing the catalyst for cracking prior to its use for naphtha treating because a catalyst which has ceased to give a desirable product distribution in cracking may still have considerable utility for effecting the isoforming of thermally cracked naphtha. If the process were to be operated in this manner transfer line 57 would discharge through line 105 and transfer line 34 through line 106.

In the preferred example hereinabove described each of the catalyst contacting steps is effected while the catalyst is in gas or vapor suspension. Furthermore, the catalyst is maintained in fluent condition throughout the entire system, an aerating gas velocity of about .05 to .5 feet per second being maintained in the various columns and hoppers for this purpose. The purpose of the columns is to provide the necessary pressure at various points in the system and the catalyst is carried from the base of one column to the top of the other column by the pneumatic gas lift effect of the reaction vapors or regeneration gases. It should be understood, however, that our invention is not limited to systems of the so-called fluid type as hereinabove described but is likewise applicable to moving bed catalyst systems or even to fixed bed systems.

The outstanding feature of our invention is the preconditioning of the catalyst in one reaction so that optimum catalyst activity may be obtained in another reaction without the detriment of hyper-activity and over-treating. As above stated, the small amount of carbon which is deposited on superactive catalyst surfaces is beneficial for naphtha treating or gas oil cracking while the carbonaceous material which is incompletely burned from the catalyst in the regenerator is actually detrimental in that it impairs catalyst activity and leads to undesirable product distribution.

Our invention is not limited to the particular modification nor to the particular details hereinabove set forth and many other modifications and operating conditions will be apparent to those skilled in the art from the above description.

One modification which deserves special mention is that of employing a parallel arrangement of preconditioning contacting steps prior to a catalytic cracking step so that a part of the catalyst receives its small deposit of carbonaceous material by contacting gases and another part of the catalyst receives its initial carbonaceous coating by contacting naphtha vapors. The invention is applicable to any and all arrangements for effecting the deposit of about .05 to 1.0% measured as carbon on the catalyst by use of a relatively clean stock such as a naphtha or a hydrocarbon gas. If the catalyst is initially contacted with a dirty stock such as a tar or refractory cycle stock, the advantages of our process are not obtained because an undesirable carbonaceous coating is laid down on the catalyst which may impair its subsequent activity and give undesirable product distribution in a subsequent conversion.

We claim:

1. The method of obtaining high yields of high quality motor fuel and low losses to gas and coke in a catalytic conversion process wherein hydrocarbon vapors are contacted with a catalyst comprising silica and a metal oxide of the class consisting of alumina and magnesia which method comprises initially contacting said catalyst at elevated temperatures with clean hydrocarbon vapors under such conditions as to deposit on said catalyst about .05 to 1.0% by weight of carbonaceous material, separating said vapors from said catalyst under conditions for preventing condensation of vapors to liquids whereby the catalyst is maintained in dry condition, and subsequently contacting a moving mass of said catalyst with gas oil vapors at a temperature of about 800 to 1000° F., at a pressure of about atmospheric to 50 pounds per square inch, with a gas oil vapor residence time in the subsequent contacting zone of at least 2 to 40 seconds and with an amount of catalyst defined by the following formula:

$$T = at^{.534}$$

where T is tons of catalyst in the subsequent contacting zone per hundred barrels of charging stock per hour, $t$ is catalyst residence time in minutes and $a$ is a constant ranging from about 0.3 to 12.0.

2. The method of claim 1 wherein the gas oil contacting step is effected while the catalyst is in vapor suspension and the catalyst density in such suspension is about 1 to 35 pounds per cubic foot.

3. The method of claim 1 wherein the gas oil contacting step is effected while the catalyst is in vapor suspension and wherein the vertical velocity of the gas oil vapors in the contacting step ranges from about .5 to 5 feet per second.

4. The method of utilizing a silica-alumina catalyst both for the treatment of naphtha and gas oil respectively which comprises first suspending catalyst in naphtha vapors under such conditions of temperature, pressure and contacting time that a carbonaceous deposit of about .05 to 1.0% by weight is deposited thereon, separating gases and vapors from the catalyst under such conditions as to leave the catalyst in substantially dry fluent form, suspending the dry fluent catalyst in gas oil vapors and contacting the coated catalyst with said gas oil vapors under such conditions of temperature, pressure and contacting time that a substantial amount of said vapors are converted into hydrocarbons of the gasoline boiling range without the degradation of charging stock that would have obtained in the absence of the naphtha vapor contacting step.

5. The method of claim 4 wherein the gas oil contacting step is effected while the catalyst is suspended in gas oil vapors and wherein the vertical velocity of said vapors in said contacting step is about .5 to 5 feet per second.

6. The method of obtaining high yields of high quality motor fuel and low losses to gas and coke in a catalytic conversion process wherein hydrocarbon vapors are contacted with a catalyst comprising silica and a metal oxide of the class consisting of alumina and magnesia, which method comprises initially treating said catalyst at an elevated temperature with a first stream of hot hydrocarbon vapors under such conditions as to deposit on said catalyst about 0.05 to 1% by weight of carbonaceous material, separating said vapors from said catalyst under conditions for preventing condensation of vapors to liquids whereby the catalyst is maintained in hot, dry condition, passing said separated catalyst downwardly through a substantially vertical zone of limited cross-sectional area, aerating said catalyst in its downward passage through said substantially vertical zone, discharging catalyst from the base of said substantially vertical zone into a second stream of hot hydrocarbon vapors whereby said catalyst is suspended in the vapors of said stream, introducing said stream of suspended catalyst at the base of a contacting zone of large cross-sectional area, passing vapors upwardly through said contacting zone at a vertical velocity within the approximate range of .5 to 5 feet per second and sufficient to maintain therein a catalyst suspension having a density within the approximate range of 10 to 35 pounds per cubic foot, and effecting contact of catalyst with vapors in said contacting zone at a temperature within the approximate range of 800 to 1000° F., at a pressure of about atmospheric to about 50 pounds per square inch and with a vapor residence time in the contacting zone of at least 2 to 40 seconds.

ALEX G. OBLAD.
LLEWELLYN HEARD.